(12) United States Patent
Ince et al.

(10) Patent No.: US 9,282,174 B2
(45) Date of Patent: Mar. 8, 2016

(54) NETWORK CONNECTIVITY MEASUREMENT SYSTEM AND METHOD

(71) Applicant: Time Warner Cable Enterprises LLC, New York, NY (US)

(72) Inventors: Kamil Ince, Herndon, VA (US); Jeff Aitken, Leesburg, VA (US); Wes George, Manassas, VA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 249 days.

(21) Appl. No.: 13/771,604

(22) Filed: Feb. 20, 2013

(65) Prior Publication Data

US 2014/0237107 A1    Aug. 21, 2014

(51) Int. Cl.
*G06F 15/173* (2006.01)
*H04L 29/14* (2006.01)
*H04L 29/06* (2006.01)
*H04L 12/26* (2006.01)

(52) U.S. Cl.
CPC ............ *H04L 69/40* (2013.01); *H04L 43/0811* (2013.01); *H04L 43/106* (2013.01); *H04L 69/28* (2013.01)

(58) Field of Classification Search
CPC ... H04L 67/40; H04L 43/0811; H04L 43/106; H04L 69/28
USPC .......................................................... 709/224
See application file for complete search history.

(56) References Cited

U.S. PATENT DOCUMENTS

| | | | | |
|---|---|---|---|---|
| 6,868,094 B1 * | 3/2005 | Bordonaro | .......... | H04L 41/5009 370/516 |
| 8,819,512 B1 * | 8/2014 | Wang | ........................ | H04L 1/08 714/748 |
| 2002/0191627 A1 * | 12/2002 | Subbiah | ................ | H04W 36/02 370/428 |
| 2004/0073655 A1 * | 4/2004 | Kan | .................... | H04L 12/2602 709/224 |
| 2006/0285500 A1 * | 12/2006 | Booth, III | ........... | H04L 41/5035 370/250 |

* cited by examiner

*Primary Examiner* — Jude Jean Gilles
*Assistant Examiner* — Jaren M Means
(74) *Attorney, Agent, or Firm* — The Marbury Law Group, PLLC (57) ABSTRACT

A system and method for detecting a transient outage of an Internet Protocol (IP) network. A probe sending device sends probe packets over the IP network. A probe packet includes a probe sequence number and a timestamp value issued by the probe sending device. A probe receiving device receives a current probe packet. The probe receiving device overwrites probe packet data obtained from a last received probe packet with the current probe packet when the current probe sequence number exceeds the sequence number of the last received probe packet by one. The probe receiving device stores the current probe packet data obtained from the current probe packet when the current probe sequence number exceeds the sequence number of the last received probe packet by more than one.

16 Claims, 6 Drawing Sheets

| 502 Listener IP Addr | 504 Caller IP Addr | 506 Case | 508 Count | 510 Timestamp | 512 Time Delta |
|---|---|---|---|---|---|

NETWORK CONNECTIVITY MEASUREMENT SYSTEM AND METHOD

BACKGROUND

Networks that rely on the Internet protocol (IP) networks are required to have a greater degree of reliability than ever before. IP backbones are being utilized more and more for applications that are more sensitive to packet drops than classical IP applications have been in the past. High quality voice and video applications require higher resiliency of networks in this context.

When a service outage occurs, measurements of the outage, its duration and cause(s) provide documentation of events for post-mortem analysis, base-lining of expected outages during convergence events, and predictive analysis for early recognition of future failures. Typical network diagnostic tools use probe packets to confirm network connectivity between endpoints. A failure of a probe packet to arrive at an endpoint signals a failure in a network path. Knowledge of which nodes in a network path received the probe packet may be used to estimate where in the network architecture the failure occurred.

While using probe packets in this way may provide useful network fault diagnostic information, current diagnostic tools generally provide information on a macro level about faults that require intervention (e.g., long duration faults).

In a typical fault identification system, network probe packets are sent over a network path according to a pre-programmed cycle. In this type of system, probe packets may be sent, for example, every minute, or every five minutes, to a specific targeted device. The process then moves to the next targeted device until all targeted devices have been sent probe packets. The cycle then starts again with the first targeted device. In this type of system, the resolution for outages is limited by whether the probe packet is actively sending/receiving traffic on the path affected during the instant that an outage happens. This basically means that an outage has to be longer than the cycle time of the probe packet cycle. Often, the fault identification system misses transient outages consisting of very small but steady loss or a burst of errors so brief that the aggregate impact to the thousands or millions of flows carried over large-bandwidth circuits is negligible. While such outages may not impact service in a noticeable way (i.e., create out-of-service conditions), they may affect the quality of video and audio streams and may trigger network responses (e.g., cause a TCP stream to slow down because the transient packet loss is misidentified by network management systems as congestion).

Systems for stress testing network configurations in lab environments typically utilize a testing device that operates as a probe packet source, sends probe packets to a network under test, and receives probe packets as a network endpoint from the network under test. The network configuration may be stressed, such as introducing a failure in a primary path, and the network response measured by the testing device. The closed loop allows the testing device to precisely establish a reference time for sent and received probe packets and to measure the time for the network under test to reroute traffic around the introduced error (sometimes referred to herein as the "convergence time").

Observing the behavior of a network configuration in a lab environment provides useful data regarding selected protocols, selected devices and network topography. However, tools designed for use in laboratory environments are not effective for use in monitoring operational networks because such tools require strict control of network configurations, network traffic and probe timing that are not available in operational networks. Such tools are not useful for observing transient network phenomena.

SUMMARY

Embodiments are directed to a system and method for detecting and analyzing transient network outages.

In one embodiment, a network performance measurement (NPM) system comprising a "caller" device (sometime referred to herein as the "caller unit") and a "listener" device (sometimes referred to herein as the "listener unit"). The NPM caller device is installed on a network, such as at a network node, and is configured to send probe packets over a network. In an embodiment, the probe packets comprise a sequential probe packet number and a timestamp issued by the caller unit.

The NPM listener device is installed on a network, such as at a network node, and is configured to process probe packets it receives. Depending on the configuration of the network, a network location, such as a network node, may have both a caller unit and listener unit.

In an embodiment, probe packets that are received by the listener unit from the caller unit in sequence are disregarded. Probe packets that are received by the listener unit from the caller unit that arrive with a gap in the sequence or in an out of order sequence are flagged as indicative of a transient outage or short-duration outage. In an embodiment, the time stamp of the first-to-arrive probe is subtracted from the time stamp of the second to arrive probe to produce a duration of the transient outage.

Probe packets may be configured to include different type-of-service (ToS) field values to allow a node to test a ToS dependent network configuration or condition.

In another embodiment, transient outages are logged and correlated with network states to identify causal relationships between states and outages.

DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments are described in detail with reference to the accompanying drawings. Wherever possible, the same reference numbers are used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "IP network" is used generically herein to refer to IPv4 or IPv6 compatible networks and may encompass both wired and wireless networks/technologies.

Any references to terminology and/or technical details related to an individual wired or wireless communications standard or technology are for illustrative purposes only, and not intended to limit the scope of the claims to a particular communication system or technology unless specifically recited in the claim language.

Examples of wired IP network technologies and networks include cable networks, fiber optic networks, hybrid-fiber-cable networks, networks that implement the data over cable service interface specification (DOCSIS), networks that utilize asymmetric digital subscriber line (ADSL) technologies, etc.

Examples of wireless IP network technologies include third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden).

Each of these wired and wireless technologies involves, for example, the transmission and reception of data, signaling, and/or content messages.

As mentioned above, current diagnostic tools generally provide information on a macro level about faults that require intervention (e.g., long duration faults). Embodiments illustrated herein are suitable for detection of transient outages in IP networks, particularly IP networks that operate continuously or for defined periods in which planned "offline" conditions are readily distinguished from outages.

Figure 1:
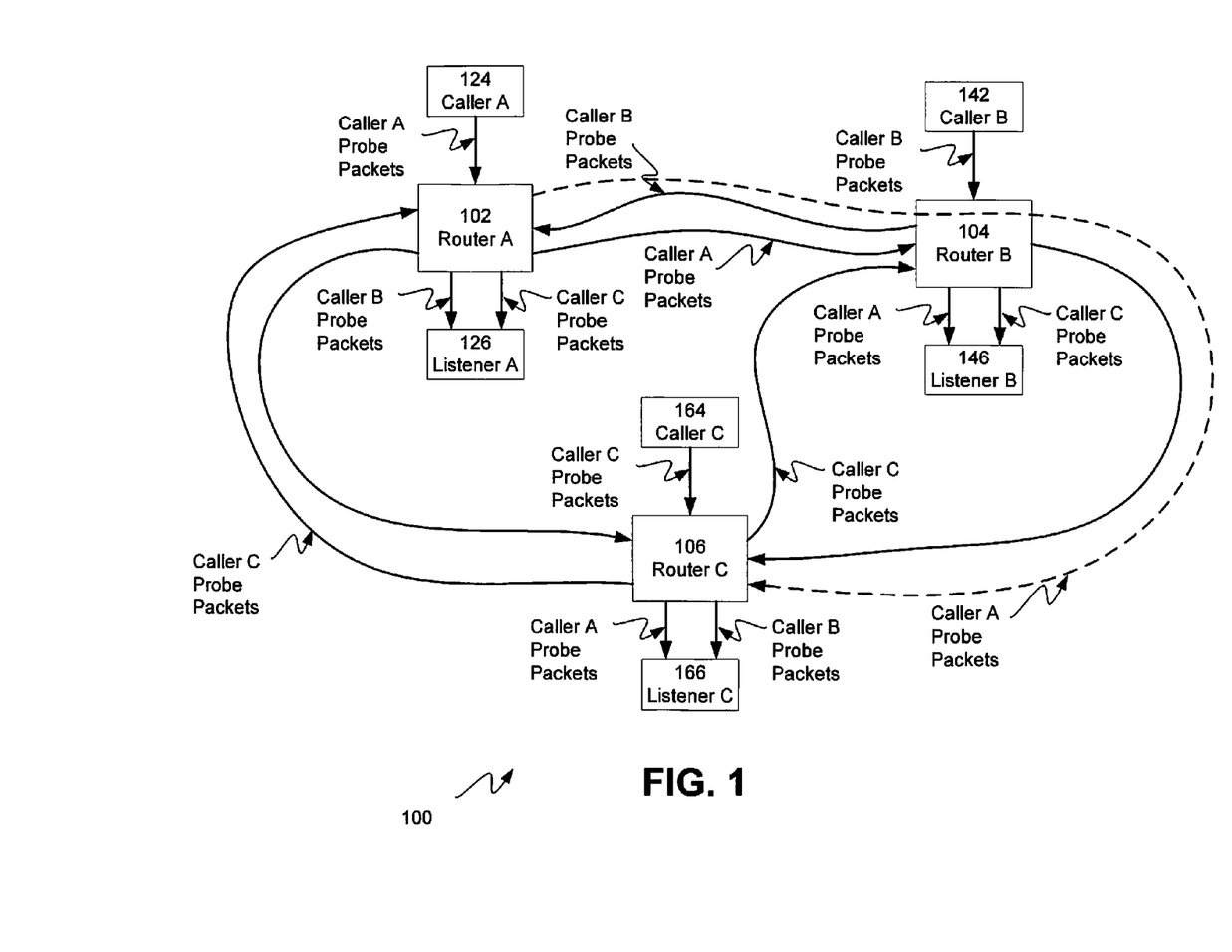
FIG. 1 is a block diagram illustrating a network architecture in which routers of the network interface with both an NPM caller unit or device (a "probe sending device") and an NPM listener unit or device (a "probe receiving device") to send and receive probe packets according to embodiments.

FIG. 1 is a block diagram illustrating a network architecture in which routers of the network interface with both an NPM caller unit or device (sometimes referred to as a "probe packet sending device") and an NPM listener unit or device (sometimes referred to as a "probe packet receiving device") to send and receive probe packets according to embodiments. The term "unit" and "device" are used herein interchangeably and are not meant to be limiting. Collectively, the caller device and the listener device may sometimes be referred to as an NPM probe server.

The network illustrated in FIG. 1 is a mesh network. However, the selection of this network topology is for illustrative purposes only and is not meant to be limiting. The components of the NPM system described in the context of FIG. 1 may be utilized in other network topologies including, by way of example, star network, a bus or line network, a loop or ring network, and a tree network. As illustrated in FIG. 1, a mesh network 100 has three routers A, B, and C. The selection of three routers is for illustrative purposes only and is not meant to be limiting.

Router A 102 interfaces with a caller device A 124 that sends probe packets to listener device B 146 connected to router B 104 and to listener device C 166 connected to router C 106. Router A 102 also interfaces with a listener device A 126 that listens for probe packets from caller device B 142 connected to router B 104 and from caller device C 164 connected to router C 106.

Router B 104 interfaces with a caller device B 142 that sends probe packets to listener device A 126 connected to router A 102 and to listener device C 166 connected to router C 106. Router B 104 also interfaces with a listener device B 146 that listens for probe packets from caller device A 124 connected to router A 102 and from caller device C 164 connected to router C 106.

Router C 106 interfaces with a caller device C 164 that sends probe packets to listener device A 126 connected to router A 102 and to listener device B 146 connected to router B 104. Router C 106 also interfaces with a listener device C 166 that listens for probe packets from caller device A 124 connected to router A 102 and from caller device B 142 connected to router B 104.

Also illustrated in FIG. 1 is a path by which router A 102 may send probe packets through the router B 104 to the router C 106. Similar paths (not illustrated for clarity) may be constructed by which probe packets sent from an originating router to a destination router pass though one or more intermediate routers.

Figure 2:
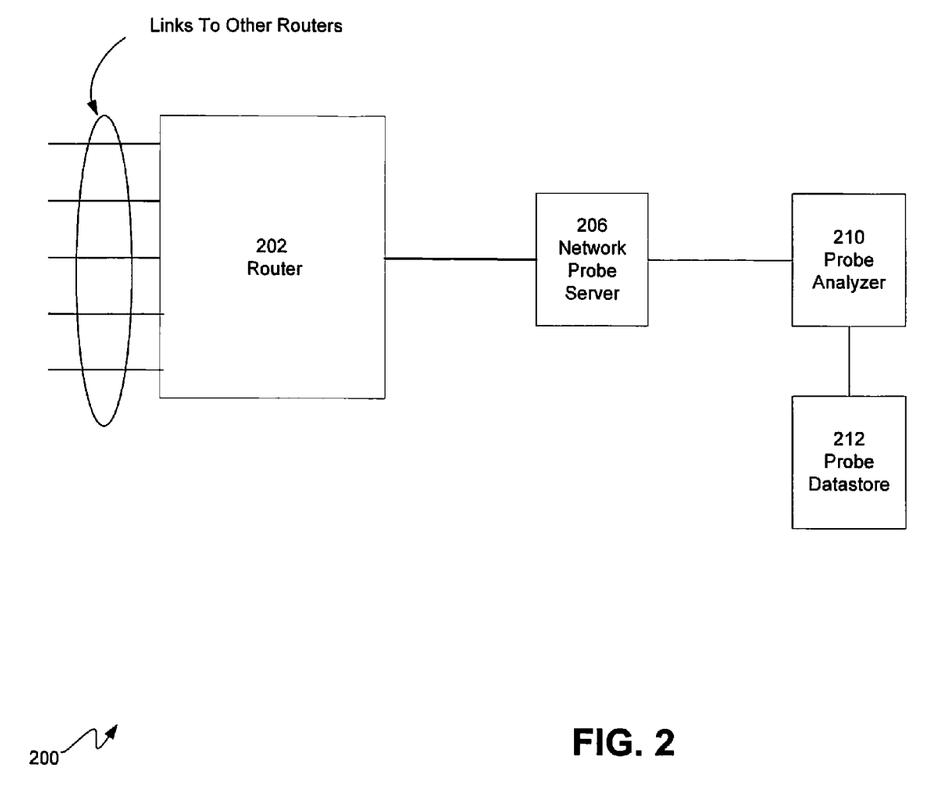
FIG. 2 is a block diagram illustrating sample components of an NPM system according to various embodiments.

FIG. 2 is a block diagram illustrating sample components of a node configured with an NPM system according to various embodiments. As previously described, components of an NPM system may connect to a network at locations that include, but are not limited to, nodes.

A router 202 provides links to other routers in a network. By way of illustration and not by way of limitation, the router 202 may be a core router within a network node. An NPM network probe server 206 sends probe packets to the router 202 and receives probe packets from other network probe servers 206 in the network. By locating NPM system components in nodes of a single network, the data acquired from the probe packets may be evaluated in light of that network's topology and operational history to determine causes of outages.

In an embodiment, a continuous stream of probe packets is sent by the network probe server 206. The interval separating the probe packets with the stream is configurable. For example, the interval between probe packets may be selected from a range of about 1 millisecond to 40 milliseconds.

Received probe packets are evaluated by a probe packet analyzer 210. In an embodiment, the probe packet analyzer 210 comprises a processor (described below) that is configured to apply an algorithm (described below) to received probe packets. The probe packet analyzer 210 discards probe packets that are evaluated as good (i.e., not indicative of an outage) and stores probe packet data of probe packets that indicate that a fault occurred. The probe packet data may then be used to correlate transient outages with network events and/or states based on the probe packets that indicate that a fault has occurred. For example, the probe packet data may be used to determine that a probe was rerouted and why the route was changed.

Figure 3:
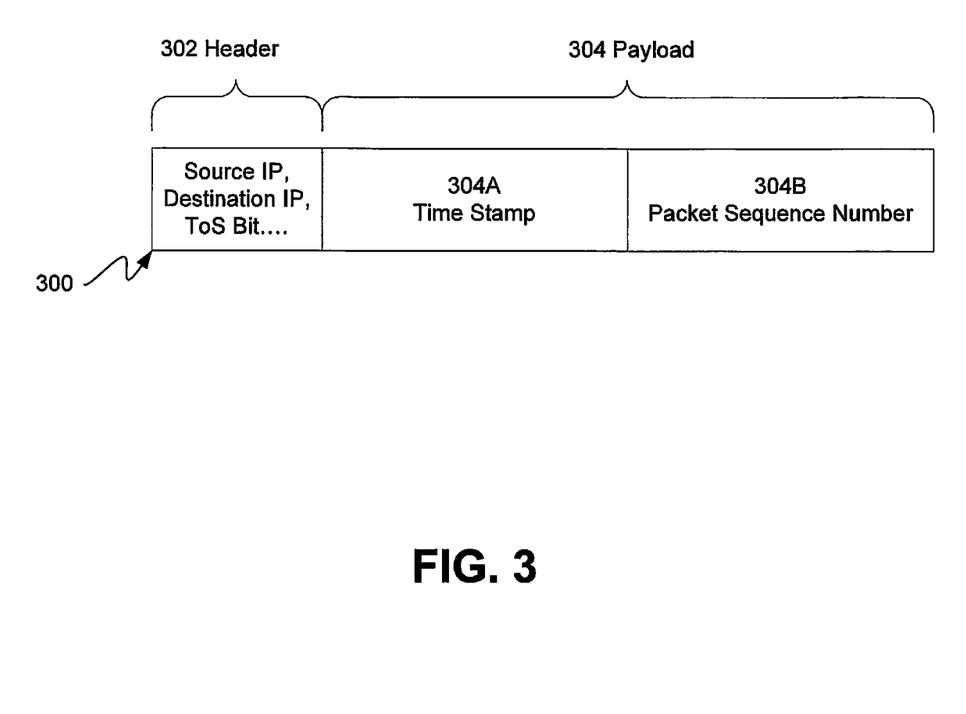
FIG. 3 is a block diagram illustrating a probe packet in accordance with various embodiments.

FIG. 3 is a block diagram illustrating a probe packet in accordance with various embodiments.

A probe packet 300 comprises a header 302 and a payload 304. The payload 304 includes a timestamp 304A and packet sequence number 304B. In an embodiment, the time stamp 304A comprises a date and a time determined by the clock time of the NPM probe server that sends the probe packet 300. The header 302 comprises a source IP address, a destination IP address and, optionally, a type-of-service (ToS) field. The source IP address identifies the IP address of the network probe server 206 that sends the probe. The destination IP address identifies the network probe server 206 that is the intended endpoint of the probe packet 300.

The ToS field may be used to specify a priority for a packet and to specify a queue to send the packet through to ensure that it conforms to a defined policy (e.g., low-delay, high-throughput). For example, a ToS field may be used to simulate a voice or video packet that is entitled to priority relative to other packets when network resources are insufficient to handle all packets. In an embodiment, probe packets that include a ToS field may be sent using a designated port on a calling device and received on the same port of a listening device.

Figure 4:
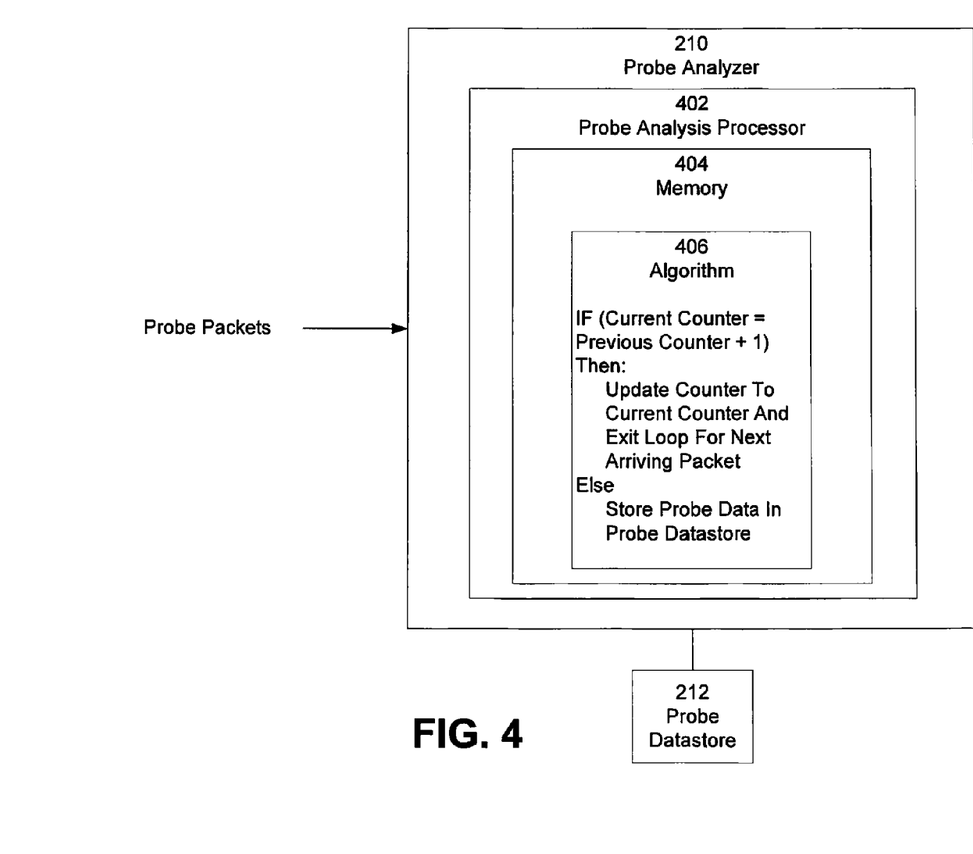
FIG. 4 is a block diagram illustrating a filtering algorithm applied to the probe packets received by a listener device according to an embodiment.

FIG. 4 is a block diagram illustrating a filtering algorithm applied to probe packets received by a network probe server according to an embodiment.

The probe analyzer 210 comprises a probe analysis processor 402 in communication with a memory 404. The memory 404 comprises an algorithm 406 that tests the sequence field (FIG. 3, 304B) of in-coming packets to determine whether the packets are in sequence. Upon the arrival of the "current" probe packet, the processor of the probe analyzer 210 determines whether the packet sequence number of the current probe packet exceeds the packet sequence number of the last received packet sequence number by one. If this determination is "true," then the currently received probe packet is disregarded, the most currently received packet sequence number becomes the last received packet sequence number, and the next received packet (the "new" current probe packet) is processed against the "new" last received packet (the previous current probe packet) sequence number.

In an embodiment, the packet sequence number and the timestamp of the last received probe packet are stored as hash values.

The process of discarding in-sequence probe-packets reduces the amount of data that must be stored by the probe analyzer 210. Thus, information that is indicative of an outage, either transient or otherwise, is kept for analysis while data that appears in the appropriate expected sequence may be discarded.

Figure 5:
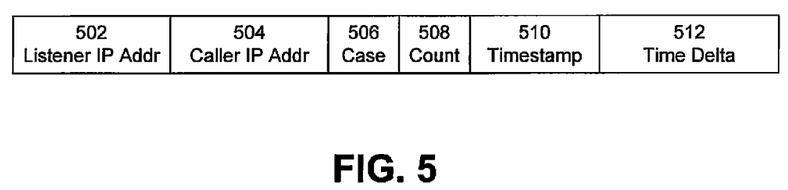
FIG. 5 is block diagram illustrating a probe datastore log according to an embodiment.

If determination by algorithm 406 is "false," that is, if the packet sequence number of the current probe packet exceeds the packet sequence number of the last received packet sequence number by more than one, selected probe packet data are stored in probe datastore 212 (FIG. 2). In an embodiment illustrated in FIG. 5, the packet probe data include the IP address of the listener (502), the IP address of the caller (504), an assigned case number 506 (discussed below), a count of missed packets 508 (current sequence number minus the last sequence number minus 1), the last packet timestamp 510, and an outage duration 512 (current packet timestamp less the last packet timestamp).

In yet another embodiment, additional rules are applied to packets before they are saved or discarded. For example, if the packet sequence number of the current probe packet exceeds the packet sequence number of the last received packet sequence number by more than one, the time differential between the current probe packet and the previously received probe packet is compared to a user configurable threshold. Packets for which the time differential is less than the threshold may be discarded. Packets for which the time differential is equal to or exceeds the threshold are stored. The user configurable threshold may be changed to adjust the "granularity" of the data that is retained or discarded. In an embodiment, the configurable threshold is related to the probe packet interval by the equation: threshold >3x (probe packet interval).

Under certain circumstances, a probe packet may be received from a network probe server 206 that was not previously on-line or has come back on-line. In this situation, the probe packet data may be stored in probe datastore 212 and assigned a case number to reflect the context in which it was received.

In an embodiment, a case number may be assigned to the probe packet based on a set of rules that are implemented by the probe analyzer 210. For example, when the packet sequence number of the current probe packet exceeds the packet sequence number of the last received packet sequence number by more than one and the time differential is equal to or exceeds the threshold, the packet may be assigned a case number of 10. When the packet sequence number of the current probe packet exceeds the packet sequence number of the last received packet sequence number by more than one and the time differential is less than the threshold, the packet may be assigned a case number of 1. Other rules may be established to preserve the circumstances under which probe packets were selected for saving.

While the above embodiments relate to determining the presence or absence of certain probe packets, it is also possible to utilize different types of probe packets in a diagnostic fashion to provide better information relating to transient outages. In this fashion, probe packets themselves may be diagnostic in nature as will be the timing of when probe packets that are indicative of transient outages are received.

In other embodiments, analysis of the probe packets themselves and the timing of when problematic probe packets are received may be input to an analysis engine that can provide further insight into the causes for transient outages.

Figure 6:
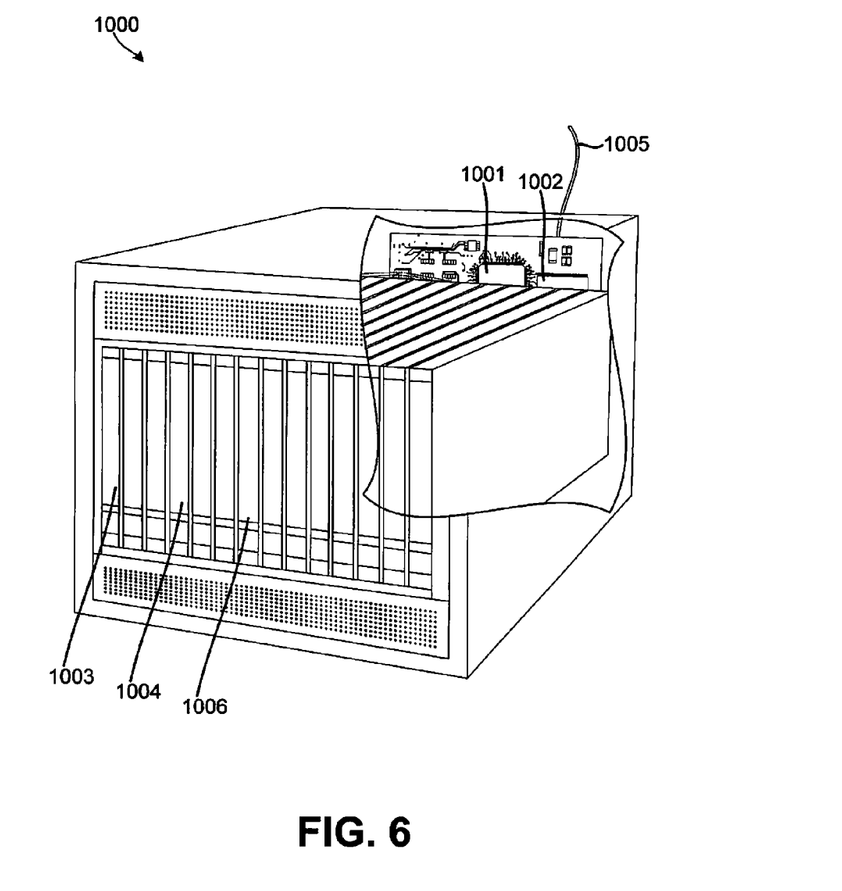
FIG. 6 is a system block of a server suitable for use with any of the embodiments.

The various network components, servers, and systems may be implemented on any of a variety of commercially available server devices, such as the server 1000 illustrated in FIG. 6. Such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1006 coupled to the processor 1001 for establishing data connections with a network 1005, such as a local area network coupled to other computers, servers, or components in a service provider network.

The processor 1001 may be any programmable microprocessor, microcomputer or multiple processor chip or chips that can be configured by software instructions (applications) to perform a variety of functions, including the functions of the various embodiments described above. In some mobile receiver devices, multiple processors may be provided, such as one processor dedicated to wireless communication functions, one processor dedicated to video processing, and one processor dedicated to running other applications. Typically, software applications may be stored in the internal memory 1002 before they are accessed and loaded into the processor 1001. The processor 1001 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as hardware, software, or any combination thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

Embodiments implemented in computer software may be implemented in software, firmware, middleware, microcode, hardware description languages, or any combination thereof. A code segment or machine-executable instructions may represent a procedure, a function, a subprogram, a program, a process, a task, a tread, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. Non-transitory computer-readable or processor-readable media includes both computer storage media and tangible storage media that facilitate transfer of a computer program from one place to another. Non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a signal processing circuit that may be suitable for use in a wireless receiver or mobile device. Such a wireless signal processing circuit may include circuits for accomplishing the signal measuring and calculating steps described in the various embodiments.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for detecting a transient outage of an Internet Protocol (IP) network, the method comprising:
   receiving by a probe receiving device a stream of probe packets from a probe sending device, wherein the stream of probe packets comprises a current probe packet, wherein the current probe packet comprises a current probe sequence number and a current timestamp value issued by the probe sending device;
   overwriting by the probe receiving device probe packet data obtained from a last received probe packet with the current probe packet when the current probe sequence number exceeds a sequence number of the last received probe packet by one, wherein the last received probe packet comprises a last probe sequence number and a last timestamp value issued by the probe sending device;
   storing by the probe receiving device probe packet data obtained from the current probe packet when the current probe sequence number exceeds the sequence number of the last received probe packet by more than one; and
   detecting by the probe receiving device a transient network fault when the current probe sequence number exceeds the sequence number of the last received probe packet by more than one and a difference between a time of arrival of the current probe sequence number and a time of arrival of the last probe sequence number exceeds a configurable threshold.

2. The method of claim 1, wherein the stream of probe packets comprises a continuous sequence of probe packets each separated by a time interval selected from a range of about 1 millisecond to 40 milliseconds.

3. The method of claim 1, wherein the IP network is selected from the group consisting of an IP4 compliant network and an IP6 compliant network.

4. The method of claim 1, wherein the packet data are selected from the group consisting of an IP address of the probe receiving device, an IP address of the probe sending device, an assigned case number, a count of missed packets equal to the current probe sequence number minus the last probe sequence number minus 1, a timestamp of the last received probe packet, and an outage duration equal to a timestamp of the current probe packet less the time stamp of the last received probe packet.

5. The method of claim 1 further comprising detecting by the probe receiving device the transient network fault when the current probe sequence number exceeds the sequence number of the last received probe packet by more than one.

6. The method of claim 5 further comprising assigning by the probe receiving device an identifier to the transient network fault.

7. The method of claim 1, wherein the stream of probe packets comprises a continuous sequence of probe packets each separated by a time interval and wherein the configurable threshold is greater than or equal to three times the time interval.

8. The method of claim 1, further comprising assigning by the probe receiving device an identifier to the transient network fault.

9. A system for detecting a transient outage of an Internet Protocol (IP) network, the system comprising:
 a probe sending device configured to perform operations comprising sending a stream of probe packets over the IP network, wherein each probe packet comprises a probe sequence number and a timestamp value issued by the probe sending device; and
 a probe receiving device configured to perform operations comprising:
  receiving a current probe packet, wherein the current probe packet comprises a current probe sequence number and a current timestamp value issued by the probe sending device;
  overwriting probe packet data obtained from a last received probe packet with the current probe packet when the current probe sequence number exceeds a sequence number of the last received probe packet by one, wherein the last received probe packet comprises a last probe sequence number and a last timestamp value issued by the probe sending device;
  storing probe packet data obtained from the current probe packet when the current probe sequence number exceeds the sequence number of the last received probe packet by more than one; and
  detecting a transient network fault when the current probe sequence number exceeds the sequence number of the last received probe packet by more than one and a difference between a time of arrival of the current probe sequence number and a time of arrival of the last probe sequence number exceeds a configurable threshold.

10. The system of claim 9, wherein the stream of probe packets comprises a continuous sequence of probe packets each separated by a time interval selected from a range of about 1 millisecond to 40 milliseconds.

11. The system of claim 9, wherein the IP network is selected from the group consisting of an IP4 compliant network and an IP6 compliant network.

12. The system of claim 9, wherein the packet data are selected from the group consisting of an IP address of the probe receiving device, an IP address of the probe sending device, an assigned case number, a count of missed packets equal to the current probe sequence number minus the last probe sequence number minus 1, a timestamp of the last received probe packet, and an outage duration equal to a timestamp of the current probe packet less the time stamp of the last received probe packet.

13. The system of claim 9, wherein the probe receiving device is further configured to perform operations comprising detecting the transient network fault when the current probe sequence number exceeds the sequence number of the last received probe packet by more than one.

14. The system of claim 13, wherein the probe receiving device is further configured to perform operations comprising assigning an identifier to the transient network fault.

15. The system of claim 9, wherein the stream of probe packets comprises a continuous sequence of probe packets each separated by a time interval and wherein the configurable threshold is greater than or equal to three times the time interval.

16. The system of claim 9, wherein the probe receiving device is further configured to perform operations comprising assigning by the probe receiving device an identifier to the transient network fault.

* * * * *